(12) United States Patent
Eylon et al.

(10) Patent No.: US 7,197,570 B2
(45) Date of Patent: Mar. 27, 2007

(54) SYSTEM AND METHOD TO SEND PREDICTED APPLICATION STREAMLETS TO A CLIENT DEVICE

(75) Inventors: Dan Eylon, Ramat Hasharon (IL); Amit Ramon, Zoran (IL); Yehuda Volk, Tel-Aviv (IL); Uri Raz, Fairlawn, NJ (US); Shmuel Melamed, Ramat-Gan (IL)

(73) Assignee: AppStream Inc., Palo Alto, CA (US)

( * ) Notice: Subject to any disclaimer, the term of this patent is extended or adjusted under 35 U.S.C. 154(b) by 556 days.

(21) Appl. No.: 09/751,105

(22) Filed: Dec. 28, 2000

(65) Prior Publication Data

US 2001/0037399 A1 Nov. 1, 2001

Related U.S. Application Data

(63) Continuation-in-part of application No. 09/120,575, filed on Jul. 22, 1998, now Pat. No. 6,311,221.

(60) Provisional application No. 60/235,535, filed on Sep. 26, 2000.

(51) Int. Cl.
  *G06F 15/16* (2006.01)
  *G06F 9/00* (2006.01)
(52) U.S. Cl. .................. 709/231; 709/203; 719/328
(58) Field of Classification Search ................ 709/318, 709/203, 231, 200–202, 204, 217–227, 230, 709/232–247; 719/328, 310–318; 718/100–104
See application file for complete search history.

(56) References Cited

U.S. PATENT DOCUMENTS 5,163,131 A  11/1992  Row et al. .................. 395/200

(Continued)

FOREIGN PATENT DOCUMENTS

EP  0 780 778 A2  6/1997

(Continued)

OTHER PUBLICATIONS

Distributed Systems Concepts and Design, pp. 69-73, 99-101, 1995, Coulouris et. al.*

(Continued)

*Primary Examiner*—John Follansbee
*Assistant Examiner*—Haresh Patel
(74) *Attorney, Agent, or Firm*—Blakely Sokoloff Taylor & Zafman LLP

(57) ABSTRACT

A method and system for streaming software applications to a client uses an application server having a library with the application files stored therein. A streaming manager is configured to send the application files to a client as a plurality of streamlets, each streamlet corresponding to a particular data block in a respective application file. A streaming prediction engine is provided to identify at least one streamlet which is predicted to be most appropriate to send to a given client at a particular time in accordance with a prediction model reflecting the manner in which the application files are loaded and used by the application. In the preferred implementation, the application files are pre-processed and stored as a set of compressed streamlets, each of which corresponds to a file data block having a size equal to a code page size, such as 4k, used during file reads by an operating system expected to be present on a client system. In addition, the server is configured to send a startup block to a new streaming client containing a file structure specification of the application files and a set of streamlets comprising at least those streamlets containing the portions of the application required to enable execution of the application to be initiated.

46 Claims, 7 Drawing Sheets

U.S. PATENT DOCUMENTS

| | | | |
|---|---|---|---|
| 5,237,460 A * | 8/1993 | Miller et al. ................... 360/8 |
| 5,394,534 A | 2/1995 | Kulakowski et al. |
| 5,487,167 A | 1/1996 | Dinallo et al. ............... 395/650 |
| 5,504,886 A | 4/1996 | Chang et al. ................ 395/600 |
| 5,581,706 A | 12/1996 | Jessup, Jr. et al. .......... 395/200 |
| 5,581,764 A | 12/1996 | Fitzgerald et al. ........... 395/703 |
| 5,668,948 A * | 9/1997 | Belknap et al. ............. 709/231 |
| 5,708,796 A | 1/1998 | Ozden et al. ................ 395/494 |
| 5,712,976 A | 1/1998 | Falcon, Jr. et al. ......... 395/200 |
| 5,742,768 A | 4/1998 | Gennaro et al. ............ 295/200 |
| 5,745,380 A | 4/1998 | Sandvoss et al. ........... 364/514 |
| 5,752,005 A | 5/1998 | Jones |
| 5,754,774 A | 5/1998 | Bittinger et al. ........ 395/200.33 |
| 5,761,477 A | 6/1998 | Wahbe et al. ............... 395/406 |
| 5,764,235 A | 6/1998 | Hunt et al. .................. 345/428 |
| 5,765,164 A | 6/1998 | Prasad et al. ............... 707/104 |
| 5,768,528 A * | 6/1998 | Stumm ....................... 709/231 |
| 5,787,284 A | 7/1998 | Blainey et al. ............. 395/701 |
| 5,802,292 A | 9/1998 | Mogul ........................ 395/200 |
| 5,809,247 A | 9/1998 | Richardson et al. |
| 5,835,749 A | 11/1998 | Cobb ......................... 395/500 |
| 5,864,870 A * | 1/1999 | Guck ...................... 707/104.1 |
| 5,878,223 A | 3/1999 | Becker et al. ......... 395/200.53 |
| 5,892,915 A * | 4/1999 | Duso et al. .................. 709/219 |
| 5,894,479 A | 4/1999 | Mohammed |
| 5,911,776 A * | 6/1999 | Guck ......................... 709/217 |
| 5,919,247 A | 7/1999 | Van Hoff et al. ............ 709/217 |
| 5,933,644 A | 8/1999 | Wallace ...................... 395/709 |
| 5,946,697 A | 8/1999 | Shen |
| 5,956,485 A * | 9/1999 | Perlman ...................... 709/204 |
| 5,956,509 A | 9/1999 | Kevner |
| 5,958,051 A * | 9/1999 | Renaud et al. ............... 713/200 |
| 5,966,702 A | 10/1999 | Fresko et al. |
| 5,974,129 A | 10/1999 | Bodnar ........................ 379/207 |
| 5,978,788 A | 11/1999 | Castelli et al. ................. 707/2 |
| 5,978,791 A | 11/1999 | Farber et al. ................... 707/2 |
| 5,987,513 A | 11/1999 | Prithviraj et al. |
| 5,991,776 A | 11/1999 | Bennett et al. |
| 6,003,087 A | 12/1999 | Housel, III et al. ......... 709/229 |
| 6,006,265 A | 12/1999 | Rangan et al. |
| 6,009,410 A | 12/1999 | LeMole et al. ............... 705/14 |
| 6,009,429 A | 12/1999 | Greer et al. |
| 6,012,071 A * | 1/2000 | Krishna et al. ............. 715/522 |
| 6,023,726 A | 2/2000 | Saksena |
| 6,029,045 A | 2/2000 | Picco et al. |
| 6,044,382 A | 3/2000 | Martino |
| 6,044,403 A * | 3/2000 | Gerszberg et al. .......... 709/225 |
| 6,047,323 A | 4/2000 | Krause ....................... 709/227 |
| 6,058,387 A * | 5/2000 | Campbell et al. ............. 706/60 |
| 6,065,046 A | 5/2000 | Feinberg et al. |
| 6,073,129 A | 6/2000 | Levine et al. ................... 707/4 |
| 6,085,193 A * | 7/2000 | Malkin et al. ................. 707/10 |
| 6,088,524 A | 7/2000 | Levy et al. .................. 395/603 |
| 6,101,495 A | 8/2000 | Tsuchida et al. ................ 707/4 |
| 6,102,287 A * | 8/2000 | Matyas, Jr. .................. 235/380 |
| 6,108,703 A | 8/2000 | Leighton et al. ............. 709/226 |
| 6,119,082 A | 9/2000 | Zinser, Jr. et al. |
| 6,122,628 A | 9/2000 | Castelli et al. ................. 707/5 |
| 6,128,653 A | 10/2000 | del Val et al. |
| 6,139,197 A * | 10/2000 | Banks ........................ 709/217 |
| 6,144,960 A * | 11/2000 | Okada et al. .................. 707/10 |
| 6,148,340 A * | 11/2000 | Bittinger et al. ............ 709/224 |
| 6,163,805 A | 12/2000 | Silva et al. |
| 6,170,008 B1 | 1/2001 | Bahlmann et al. |
| 6,173,291 B1 | 1/2001 | Jenevein |
| 6,173,327 B1 * | 1/2001 | De Borst et al. ........... 709/231 |
| 6,199,082 B1 | 3/2001 | Ferrel et al. |
| 6,199,095 B1 | 3/2001 | Robinson |
| 6,205,481 B1 | 3/2001 | Heddaya et al. |
| 6,219,671 B1 * | 4/2001 | de Vries et al. ............. 707/102 |
| 6,230,184 B1 | 5/2001 | White et al. |
| 6,256,623 B1 | 7/2001 | Jones |
| 6,256,635 B1 * | 7/2001 | Arrouye et al. ............. 707/102 |
| 6,272,598 B1 | 8/2001 | Arlitt et al. |
| 6,282,711 B1 | 8/2001 | Halpern et al. |
| 6,286,003 B1 * | 9/2001 | Muta ........................... 707/10 |
| 6,289,334 B1 | 9/2001 | Reiner et al. |
| 6,311,221 B1 * | 10/2001 | Raz et al. .................... 709/231 |
| 6,357,042 B2 | 3/2002 | Srinivasan et al. |
| 6,370,573 B1 | 4/2002 | Bowman-Amuah |
| 6,374,402 B1 | 4/2002 | Schmeidler et al. |
| 6,381,742 B2 | 4/2002 | Forbes et al. |
| 6,385,644 B1 | 5/2002 | Devine et al. |
| 6,393,526 B1 | 5/2002 | Crow et al. |
| 6,408,294 B1 * | 6/2002 | Getchius et al. ................. 707/5 |
| 6,412,004 B1 * | 6/2002 | Chen et al. .................. 709/226 |
| 6,421,777 B1 | 7/2002 | Pierre-Louis et al. |
| 6,425,125 B1 | 7/2002 | Fries et al. |
| 6,427,149 B1 * | 7/2002 | Rodriguez et al. ............. 707/10 |
| 6,438,630 B1 * | 8/2002 | DeMoney ..................... 710/56 |
| 6,453,334 B1 | 9/2002 | Vinson et al. |
| 6,453,354 B1 * | 9/2002 | Jiang et al. .................. 709/229 |
| 6,463,508 B1 | 10/2002 | Wolf et al. |
| 6,466,980 B1 * | 10/2002 | Lumelsky et al. ........... 709/226 |
| 6,484,311 B2 * | 11/2002 | Sobeski et al. .............. 717/139 |
| 6,493,434 B1 * | 12/2002 | Desmond et al. ......... 379/88.17 |
| 6,499,060 B1 * | 12/2002 | Wang et al. ................. 709/231 |
| 6,523,027 B1 | 2/2003 | Underwood |
| 6,535,894 B1 | 3/2003 | Schmidt et al. |
| 6,538,991 B1 | 3/2003 | Kodialam et al. |
| 6,572,662 B2 | 6/2003 | Manohar et al. |
| 6,574,618 B2 * | 6/2003 | Eylon et al. ..................... 707/1 |
| 6,587,127 B1 * | 7/2003 | Leeke et al. ................. 345/765 |
| 6,604,106 B1 * | 8/2003 | Bodin et al. ................. 707/101 |
| 6,615,258 B1 | 9/2003 | Barry et al. |
| 6,622,168 B1 | 9/2003 | Datta |
| 6,622,199 B1 | 9/2003 | Spall et al. |
| 6,625,581 B1 * | 9/2003 | Perkowski .................... 705/27 |
| 6,633,898 B1 | 10/2003 | Seguchi et al. |
| 6,643,650 B1 | 11/2003 | Slaughter et al. |
| 6,748,525 B1 | 6/2004 | Hubacher et al. |
| 6,757,894 B2 | 6/2004 | Eylon et al. |
| 6,763,370 B1 | 7/2004 | Schmeidler et al. |
| 6,789,252 B1 | 9/2004 | Burke et al. |
| 6,799,197 B1 | 9/2004 | Shetty et al. |
| 6,810,478 B1 | 10/2004 | Anand et al. |
| 6,839,765 B1 | 1/2005 | Sato |
| 6,845,098 B1 | 1/2005 | Strahs |
| 6,959,318 B1 | 10/2005 | Tso |
| 2001/0034736 A1 | 10/2001 | Eylon et al. |
| 2001/0037399 A1 | 11/2001 | Eylon et al. |
| 2001/0037400 A1 | 11/2001 | Raz et al. |
| 2001/0044850 A1 | 11/2001 | Raz et al. |
| 2002/0009538 A1 | 1/2002 | Arai |
| 2002/0042833 A1 | 4/2002 | Hendler et al. |
| 2002/0083183 A1 | 6/2002 | Pujure et al. |
| 2002/0087717 A1 | 7/2002 | Artzi et al. |
| 2002/0087883 A1 | 7/2002 | Wohlgemuth et al. |
| 2002/0087963 A1 | 7/2002 | Eylon et al. |
| 2002/0091763 A1 | 7/2002 | Shah et al. |
| 2002/0138640 A1 | 9/2002 | Raz et al. |
| 2002/0157089 A1 | 10/2002 | Patel et al. |
| 2002/0161908 A1 | 10/2002 | Benitez et al. |
| 2003/0004882 A1 | 1/2003 | Holler et al. |
| 2003/0009538 A1 | 1/2003 | Shah et al. |
| 2003/0056112 A1 | 3/2003 | Vinson et al. |
| 2003/0140160 A1 | 7/2003 | Raz et al. |
| 2004/0165007 A1 * | 8/2004 | Shafron ...................... 345/781 |

FOREIGN PATENT DOCUMENTS

| | | |
|---|---|---|
| WO | WO/97/46955 | 12/1997 |
| WO | WO 99/07007 A2 | 2/1999 |
| WO | PCT/US99/16055 | 7/1999 |

| WO | WO 00/05637 | 2/2000 |
| WO | PCT/US00/02190 | 6/2000 |
| WO | WO/00/46685 | 8/2000 |
| WO | WO 00/62161 | 10/2000 |

OTHER PUBLICATIONS

International Search Report for PCT/US01/30006 dated Dec. 4, 2001.

International Search Report for PCT/US01/30007 dated Dec. 13, 2001.

S.-H. Gary Chan et al., "Caching Schemes for Distributed Video Services", 1999, pp. 994-999, IEEE, Stanford, California.

"Connected, Limited Device Configuration", Java 2 Platform Micro Edition, May 19, 2000, pp. 1-56, Specification Version 1.0, Sun Microsystems, Palo Alto, California Alan Jones et al., "Handling Audio and Video Streams in a Distributed Environment", 1993, pp. 231-243, Cambridge, United Kingdom.

"Java 2 Platform Micro Edition (J2ME) Technology for Creating Mobile Devices, May 19, 2000", pp. 1-42, Sun Microsystems, Inc., Palo Alto, California.

"Java Media Framework API Guide", Nov. 19, 1999, pp. 1-91, JMF 2.0 FCS, Sun Microsystems, Inc., Mountain View, California.

*Microsoft Press Computer Dictionary, Third Edition*, 1997, pp. 1-4, Microsoft Press, Redmond, Washington.

Javed I. Khan, "Ordering Prefetch in Trees, Sequences and Graphs", Technical Report, Dec. 3, 1999, pp. 1-6, Department of Math and Computer Science, Kent State University, Kent, Ohio.

"PKZIP Application Note", Nov. 1, 2000, pp. 1-20, Version 4.0.

Zheng Wang et al., "Prefetching in World Wide Web", Nov. 18, 1996, pp. 28-32, IEEE, London, United Kingdom.

International Search Report dated Aug. 6, 2001 for PCT/US01/01501, 4 pgs.

International Search Report dated Oct. 12, 2001 for PCT/US01/01596, 3 pgs.

Alok Sinha, "Client-Server Computing", Communications of the ACM, Jul. 1992, vol. 35, No. 7, pp. 77-98.

Nevzat Hurkan Balkir, et al., "Delivering Presentations from Multimedia Servers", The VLDB Journal, 1998, pp. 294-307.

\* cited by examiner

SYSTEM AND METHOD TO SEND PREDICTED APPLICATION STREAMLETS TO A CLIENT DEVICE

CROSS-REFERENCE TO RELATED APPLICATIONS

The present application claims the benefit under 35 U.S.C. § 119 of U.S. Provisional Application Ser. No. 60/235,535 entitled "Native Streaming Architecture", filed on Sep. 26, 2000, the entire contents of which is hereby expressly incorporated by reference. The present application is also a continuation-in part of U.S. patent application Ser. No. 09/120,575, now Pat. No. 6,311,221, entitled "Streaming Modules" and filed on Jul. 22, 1998.

This application is also related to the following pending U.S. Patent applications, the entire contents of which is hereby expressly incorporated by reference: (a) U.S. patent application Ser. No. 09/237,792 entitled "Link Presentation and Data Transfer" and filed on Jan. 26, 2000 now abandoned; (b) U.S. Provisional Patent Application Ser. No. 60/177,736 entitled "Method and Apparatus for Determining Order of Streaming Modules" and filed on Jan. 21, 2000; (c) U.S. Provisional Patent Application Ser. No. 60, 177,444 entitled "Method and Apparatus for Improving the User-Perceived System Response Time in Web-based Systems" and filed on Jan. 21, 2000; and (d) U.S. Provisional Patent Application Ser. No. 60/207,632 entitled "Apparatus and Method for Improving the Delivery of Software Applications and Associated data in Web-based Systems" and filed in Mar. 25, 2000.

FIELD OF THE INVENTION

The present invention is directed to a method, system, and architecture for streaming applications from a server for execution on a client.

BACKGROUND

The Internet, and particularly the world-wide-web, is a rapidly growing network of interconnected computers from which users can access a wide variety of information. Initial widespread use of the Internet was limited to the delivery of static information. A newly developing area of functionality is the delivery and execution of complex software applications via the Internet. There are two basic techniques for software delivery, remote execution and local delivery, e.g., by downloading.

In a remote execution embodiment, a user accesses software which is loaded and executed on a remote server under the control of the user. One simple example is the use of Internet-accessible CGI programs which are executed by Internet servers based on data entered by a client. A more complex system is the Win-to-Net system provided by Menta Software. This system delivers client software to the user which is used to create a Microsoft Windows style application window on the client machine. The client software interacts with an application program executing on the server and displays a window which corresponds to one which would be shown if the application were installed locally. The client software is further configured to direct certain I/O operations, such as printing a file, to the client's system to replicate the "feel" of a locally running application. Other remote-access systems, such as one provided by Citrix Systems, are accessed through a conventional Internet Browser and present the user with a "remote desktop" generated by a host computer which is used to execute the software.

Because the applications are already installed on the server system, remote execution permits the user to access the programs without transferring a large amount of data. However, this type of implementation requires the supported software to be installed on the server. Thus, the server must utilize an operating system which is suitable for the hosted software. In addition, the server must support separately executing program threads for each user of the hosted software. For complex software packages, the necessary resources can be significant, limiting both the number of concurrent users of the software and the number of separate applications which can be provided.

In a local delivery embodiment, the desired application is packaged and downloaded to the user's computer. Preferably, the applications are delivered and installed as appropriate using automated processes. After installation, the application is executed. Various techniques have been employed to improve the delivery of software, particularly in the automated selection of the proper software components to install and initiation of automatic software downloads. In one technique, an application program is broken into parts at natural division points, such as individual data and library files, class definitions, etc., and each component is specially tagged by the program developer to identify the various program components, specify which components are dependent upon each other, and define the various component sets which are needed for different versions of the application.

Once such tagging format is defined in the Open Software Description ("OSD") specification, jointly submitted to the World Wide Web Consortium by Marimba Incorporated and Microsoft Corporation on Aug. 13, 1999. Defined OSD information can be used by various "push" applications or other software distribution environments, such as Marimba's Castanet product, to automatically trigger downloads of software and ensure that only the needed software components are downloaded in accordance with data describing which software elements a particular version of an application depends on.

Although on-demand local delivery and execution of software using OSD/push techniques is feasible for small programs, such as simple Java applets, for large applications, the download time can be prohibitively long. Thus, while suitable for software maintenance, this delivery system is impractical for providing local application services on-demand because of the potentially long time between when the download begins and the software begins local execution.

Recently, attempts have been made to use streaming technology to deliver software to permit an application to begin executing before it has been completely downloaded. Streaming technology was initially developed to deliver audio and video information in a manner which allowed the information to be output without waiting for the complete data file to download. For example, a full-motion video can be sent from a server to a client as a linear stream of frames instead of a complete video file. As each frame arrives at the client, it can be displayed to create a real-time full-motion video display. However, unlike the linear sequences of data presented in audio and video, the components of a software application may be executed in sequences which vary according to user input and other factors.

To address this issue, as well as other deficiencies in prior data streaming and local software delivery systems, an improved technique of delivering applications to a client for local execution has been developed. This technique is described in parent U.S. patent application Ser. No. 09/120,575, now U.S. Pat. No. 6,311,221, entitled "Streaming Modules" and filed on Jul. 22, 1998. In a particular embodiment of the "Streaming Modules" system, a computer application is divided into a set of modules, such as the various Java classes and data sets which comprise a Java applet. Once an initial module or modules are delivered to the user, the application begins to execute while additional modules are streamed in the background. The modules are streamed to the user in an order which is selected to deliver the modules before they are required by the locally executing software. The sequence of streaming can be varied in response to the manner in which the user operates the application to ensure that needed modules are delivered prior to use as often as possible.

Although an improvement over existing streaming technology, the "Streaming Modules" methodology generally operates on software-program boundaries and therefore the streaming is flexibility is constrained to some extent by the structure of the application files and the application itself. In addition, in one embodiment, client-side streaming functionality is added to the streamed program through the use of stub routines inserted into the program code. Thus, the source or object code of the program must be modified to prepare them for streaming.

In a newly developed application streaming methodology, described in copending U.S. Patent Application entitled "Method and System for Executing Network Streamed Applications", filed concurrently with the present application, the client system is provided with client-side streaming support software which establishes a virtual file system ("VFS") and connects it to the client's operating system such that the virtual file system appears to be a storage device. The VFS is configured as a sparsely populated file system which appears to the operating system to contain the entire set of application files but, in practice, will typically contain only portions of selected files. Client streaming functionality is provided to process streamlets or blocks of individual files and add them to the VFS as appropriate.

SUMMARY OF THE INVENTION

The present invention is directed to an improved streaming server method and system configured to stream applications to a client machine running appropriate streaming support software with client-side execution of the application. The client machines connect to the server over a network, such as the Internet, or another data network, such as a wired or wireless TCP/IP Wide Area Network (WAN). The application need not be fully installed on the client. Instead, the application is streamed to the client in streamlets or blocks which can be stored in a client-side virtual file system configured such that the application can begin to execute on the client machine after only a small fraction of the application is loaded.

More specifically, the application to be executed is stored at the server as a predefined set of blocks or "streamlets" which correspond to specific parts of the various files needed by the application to execute. In a preferred embodiment, each streamlet block corresponds to a file data block which would be loaded by the native operating system as it loads a file while running the application on the client system if the entire application were fully installed at the client. For example, standard Windows systems utilize a 4K code page when loading code blocks from disk or in response to paging requests. Preferably, each streamlet is stored in a precompressed format on the server and decompressed upon receipt by the client.

A suitable client system has streaming support software which is configured to provide a sparsely populated virtual file system ("VFS") which appears to the client operating system to be a local drive on which the entire application is stored. However, in practice, only pieces of the various files required for execution of the application may actually be present. During normal operation of an application, the Windows operating system will issue requests to load portions of the application files into memory. Conventional operating system procedures direct these I/O requests to the proper data device driver for processing. When the streaming application is initialized, the operating system is informed that the relevant data is stored on the VFS drive. Thus, as the streaming application executes and paging or data I/O requests are generated to retrieve require code or data, the operating system will automatically direct these requests to VFS for processing. If the streamlets corresponding to the requested data are present in the VFS, the appropriate data is returned to the operating system and the streaming program continues normal operation. If one or more of the requested streamlet blocks are absent from the VFS, the client issues a fetch request to the server to retrieve the needed code or data.

The server system comprises an application streaming manager which coordinates the transmission of application streamlets to one or more client systems. To improve responsiveness of the application on the client side, the server uses a predictive engine to determine an optimal order to provide streamlets to a client. The predictive engine operates on one or more predictive models which can be generated using information gathered from user interaction with the streaming application and monitoring the order in which various sections of the application's files are accessed as the application runs. Several predictive models can be provided for a given application depending on the various ways in which the application can be used. Alternatively, a single predictive model can be provided with different flows to reflect various types of user behaviors and appropriate weightings between the flows provided. The predictive model can be further modified based on feedback provided by the client system about how an application is being run on a particular client system.

When the server receives a request from a client to start a particular streamed application for the first time, the file structure for the application is forwarded to the client. Preferably, a starting set of streamlets sufficient for enabling the application to start execution is forwarded to the client as well. A program thread to coordinate the pushing of streamlets to a given client is started on the server which actively pushes streamlets to the client in accordance with the predictive model and possibly additional data forwarded to the server from the client while the application executes.

According to a further aspect of the invention, the server maintains a record of which streamlets have been sent to a client and uses this data as part of the predictive streaming process. The server includes additional functionality to detect when its record of the contents of a client's VFS may be incorrect. In such a situation, the map of the client contents is updated and this information is provided to the predictive streaming engine so that more appropriate decisions can be made regarding which streamlets to send, thus improving the overall network utilization and streaming efficiency.

Advantageously, and unlike remote-access application systems, the streaming applications execute on the client machine while the server and network resources are utilized primarily for data delivery. As a result, server and network load are reduced, allowing for very high scalability of the server-based application delivery service which can deliver, update and distribute applications to a very large number of users, as well as perform centralized version updates, billing, and other management operations. Furthermore, because the application server does not run application code but only delivers streamlets to the client, it can run on operating systems other than the application target operating system, such as Unix derivatives or other future operating systems, as well as Windows-based servers.

The present invention can be used as an enabling technology for remote application hosting, or application service provision (ASP). As broadband technology for connecting end-users to the Internet becomes more widespread, the advantages of application hosting and provision increase. However, since bandwidth limitations are likely to exist for some time, especially when compared to the bandwidth available to a locally executed application, the present invention provides ways to enhance an application delivery and make it more efficient, while at the same time creating a layer of separation between the Client and the Server, enabling much better control over server integrity and security.

BRIEF DESCRIPTION OF THE FIGURES

The foregoing and other features of the present invention will be more readily apparent from the following detailed description and drawings of illustrative embodiments of the invention in which.

DETAILED DESCRIPTION OF THE PREFERRED EMBODIMENT(S)

Figure 1:
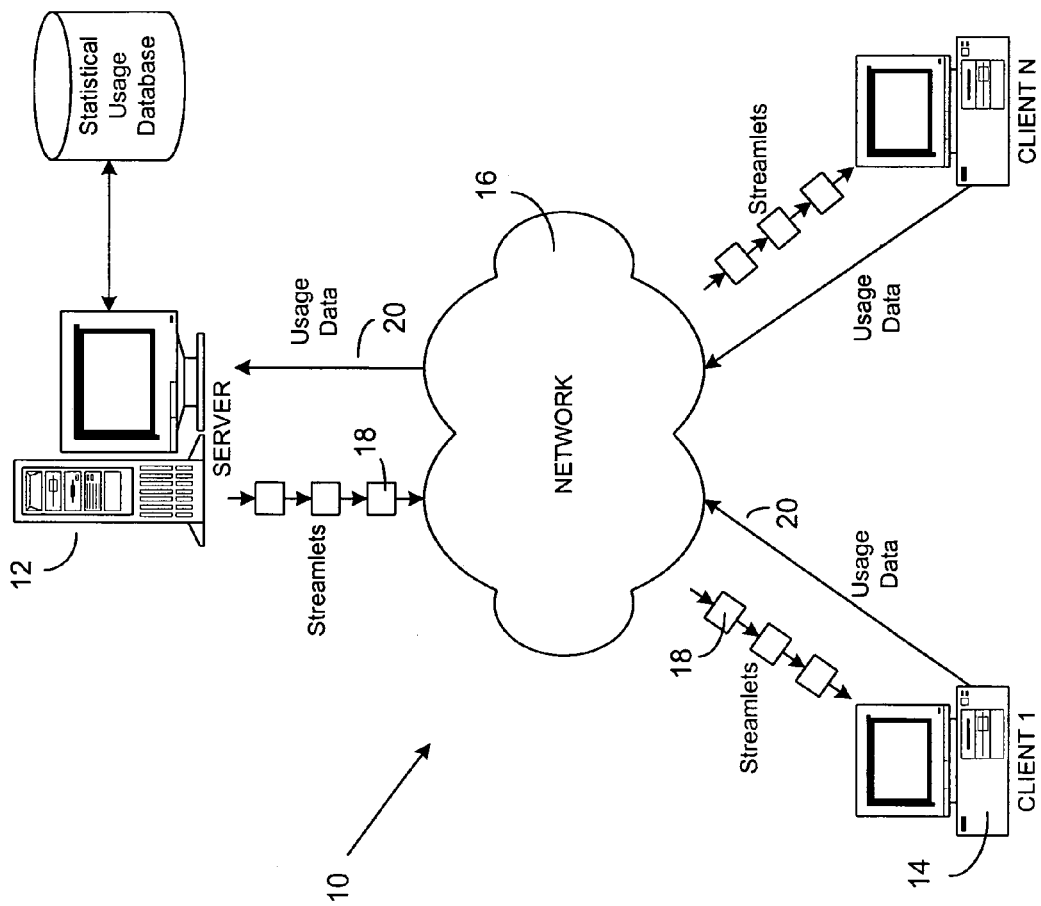
FIG. 1 is a block diagram of a system for implementing the present invention.

Turning to FIG. 1, there is shown block diagram of a system 10 implementing various aspects of the present invention. The system includes a server 12 which can be accessed by one or more clients 14 via a data network 16, such as the Internet, an intranet, extranet or other TCP/IP based communication network, or other types of data networks, including wireless data networks.

The server 12 contains data for use in streaming one or more software applications to a client on request. To prepare an application for streaming, the various files used for the application are divided into small segments called streamlets which are then stored, preferably in a compressed form, in a suitable library accessible to the server. In addition, a file structure specification for each hosted application which defines how the various files associated with an application appear to a computer when the application is locally installed is provided on the sever. An application's file structure specification can be packaged in a Startup Block which is sent to a client when streaming of the application begins. The Startup Block can also contain startup streamlet set which includes at least those streamlets containing the portions of the application required to enable execution of the application to be initiated, and preferably those streamlets required to begin application execution and have the application run to a point where user interaction is required. In addition, further application information, such as environmental variable settings, additions to system control files, and other system modifications or additions which may be required to "virtually install" the application can be provided. A preferred technique for generating the streamlet sets for an application and determining the contents of the Startup Block is disclosed in U.S. Patent Application entitled "Method and System for Streaming Software Applications to a Client" and filed concurrently with the present application, the entire contents of which is expressly incorporated by reference.

Once the startup streamlet set is received and loaded at the client, the client initiates execution of the application. Concurrently, the server continues to push streamlets to the client in accordance with the predictive model. In addition, the server is responsive to fetch requests issued by clients to retrieve specific streamlets which have not yet been delivered or were previously delivered and then subsequently discarded by he client. The streamlets can be forwarded to a client individually or grouped together and pushed in clusters as appropriate.

Various embodiments of the client system can be used. In a preferred embodiment, the client system is configured with a virtual file system which appears to the client operating system as a local drive on which all the files needed by the streaming application reside. When a required segment is not present on the client machine, the client issues a request for the appropriate streamlet(s) to the server. Usage information 20 can also be sent from the client 14 to the server 12 and can be used by the server to determine which streamlets to provide next. A preferred client system is disclosed in U.S. Patent Application entitled "Method and System for Executing Network Streamed Applications" and filed concurrently with the present application, the entire contents of which is expressly incorporated by reference.

Figure 2:
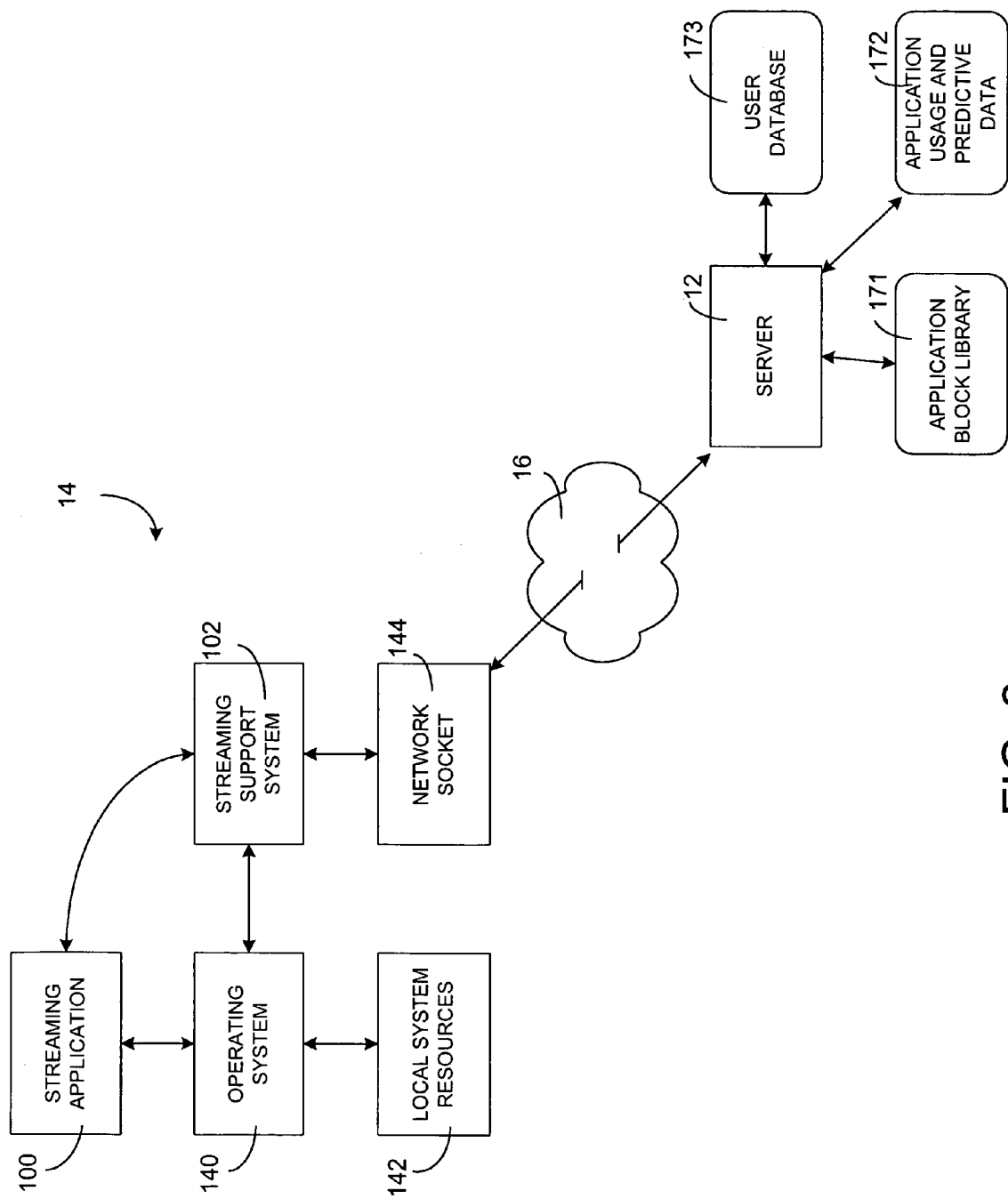
FIG. 2 is a high-level block diagram of the client and server architecture.

FIG. 2 is a block diagram of the high-level architecture of the server 12 and client 14. As shown, the server 12 has access to one or more databases which store information used to manage the application streaming. In one embodiment, the server can access an application library 171 which contains the various files for the application. Preferably, the application files are preprocessed and stored as predefined sets of compressed data streamlets each corresponding to a data block in a particular application file starting at a particular offset and having a predefined length, such as the 4k standard Windows operating system file I/O block. In an alternate but less preferred embodiment, the server can generate corresponding streamlets on-the-fly by extracting an appropriate data block from a specified file and offset.

The server also has access to a predictive data model 172 which contains information about the usage patterns of the application, such as the probability that the application will require a given streamlet block $B_n$ if the last block used was $B_m$. A user database 173 can also be provided for storing various user-specific information for use in authorizing access to streamed application, storing information related to streaming order, etc. The sever system is discussed in more detail below.

The preferred client system 14 comprises an operating system 140 which can access a variety of local system resources 142, such as data storage devices and memory. A streaming support system module 102 is provided and contains streaming control software which is generally configured to initiate the streaming of streamlets from the server 12 through, e.g., network socket 144, initiate the execution of a specified streaming application 100, process received streamlets, request specific streamlets from the server when necessary, and make received streamlets available for use by the application in a manner which is generally transparent to the native operating system 140.

Preferably, the server 12 is configured to automatically forward sequences of streamlets to the client using a predictive streaming engine which selects streamlets to forward according to the predictive model, such as a dynamic statistical knowledge base generated by analyzing the various sequences in which the application program attempts to load itself into memory as various program features are accessed. As a result, the streamlets 18 which are predicted to be needed at a given point during execution of the application are automatically sent to the client 14 so that they are generally present before the application attempts to access them. Both code and data, including external files used by the application, can be predictively streamed in this manner and, the server is generally unconcerned with the actual content of the streamlets which are sent.

Figure 3:
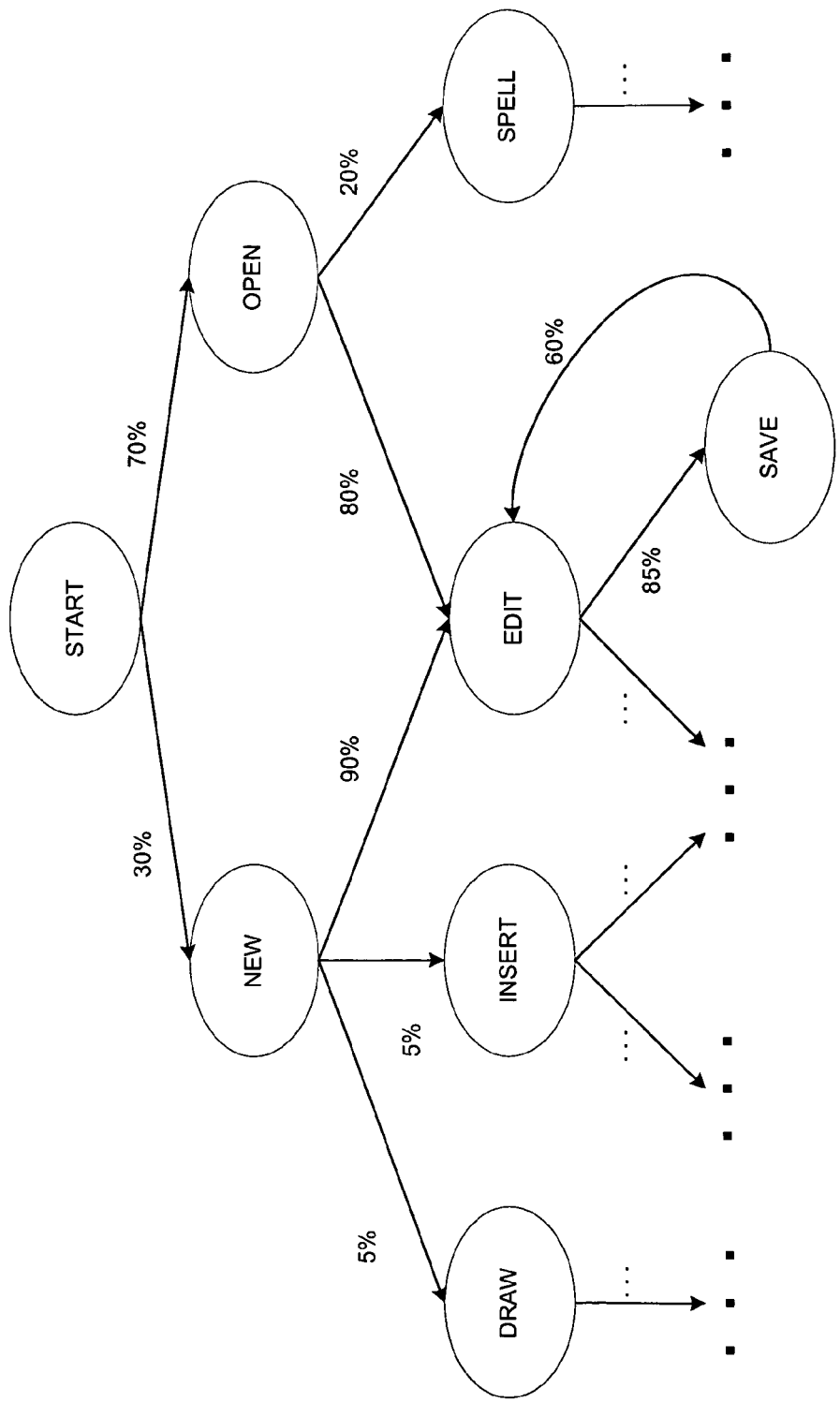
FIG. 3 is a sample usage graph used to predict usage of an application program.

Various statistical and other predictive techniques can be used to analyze the sequence of code and data loads generated by an operating system as it executes an application and determine an optimal order to push the application streamlets to the client. In one embodiment, the predictive knowledge base can be used which can be viewed as a graph where a node is a user request (e.g. save, load) or a request by the operating system to load a given portion of one the application files, and an edge is the calculated probability that such a request will be made. A simple example of such a graph is shown in FIG. 3. For simplicity, the nodes are illustrated as basic application functions. By examining the links flowing from a given node, the predictive engine can easily determine the most likely future requests and, with access to an appropriate database, determine the streamlets which will be needed by the application to execute those requests. When the user strays from the predictive path and a streamlet fetch request is issued, the predictive routine can be re-centered on a node which corresponds to functionality associated with the requested streamlets and the predictive stream restarted from that point.

In a preferred embodiment, the server updates a prediction model for an application in response to usage data provided by the clients connected to the server. In this manner, the server can adapt its model to different usage patterns, depending on the population of users who actually use the application. Several different models can be provided for each application based on the type of user at issue. For example, one set of users accessing a desktop publishing application may concentrate on text-based functionality while another set of users accesses generally graphical functions. Different predictive models may be appropriate for the various user-types. The system can dynamically assign users to various type categories based on an analysis of their usage patterns. Personalized predictive models can also be generated in which the activity of a particular user is analyzed and used to generate a personalized predictive model.

As will be recognized by those of skill in the art, other predictive analysis techniques for use in selecting which streamlets to forward to the client can also be used, such as Neural Networks and various statistical techniques, and the particular predictive technique uses is not critical to the invention. While the efficiency with which a streamed application is executed on the client machine can vary depending on the order in which the streamlets are delivered, provided that the server is generally compatible with the basic communication protocols and data format used by the client, the operation of client side streaming support software is not generally dependant on the specific manner in which the server system is implemented.

Figure 4:
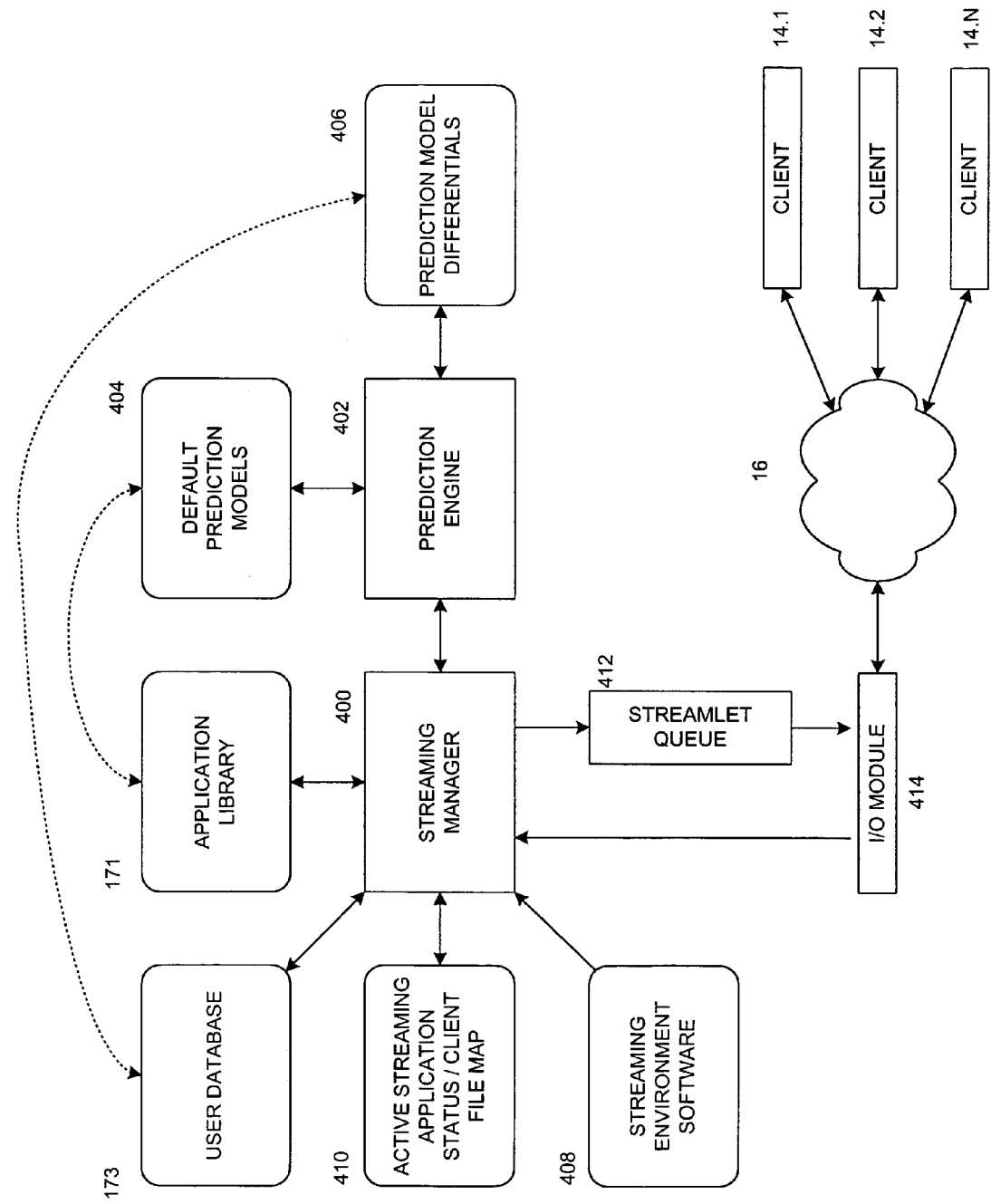
FIG. 4 is a block diagram of the server system.

FIG. 4 is a more detailed block diagram of the server system 12 showing various program modules and database systems. In this embodiment, the server has two primary modules: a streaming manager 400 and a prediction engine 402. Various databases, archives, etc. are also provided. The streaming manager 400 is responsible for coordinating the streaming of applications to one or more clients 14.1–14.N. The prediction engine 402 is accessed by the streaming manager 400 and identifies the next one or more streamlets which are predicted to be most appropriate to send to a given client at a given time.

The streaming manager 400 can be connected to the communication network 16 in a variety of ways. In general, access will be provided through a suitable I/O module 414 connected to the network. Depending on the manner of implementation, a streamlet queue 412 can be provided in which the streaming manager 400 can place streamlets directed to a particular client for subsequent transmission.

As discussed above, the server is configured to stream blocks or sections of application files to the client and the streamlets for the various files of an application can be stored in the application library 171. The stored data can be organized in many ways. In a preferred embodiment, each streamlet corresponds to a compressed data block from a particular file and is stored using the file name and offset of the block's starting location in that file as an index in the database. When a streamlet is forwarded to the client, the transmission indicates the file and offset which define the source of the streamlet data, either directly or via a unique name which can be referenced to a file and offset lookup table by the client. Error detection and recovery information can also be included in the transmission.

The application library 171 can also provide storage for the Startup Block which is forwarded to the client when a streaming application is first started. The block can be preassembled. Alternatively, the various components of the block can be combined by the streaming manager when appropriate such that the Startup Block does not contain elements which are already on the client system.

The application library 171 can also store one or more prediction models for a given application. The models can be subsequently accessed by the prediction engine 402 directly from the application library database 171. Alternatively, the prediction models can be stored in a separate library or database 404 in a form which may be more suitable for use by the prediction engine 402. For example, the application library 171 can contain the master set of prediction models while the default model library 404 is populated by prediction modules extracted from the library 171 when a streaming application is started. The modules in library 404 can subsequently be altered during an active streaming session, i.e., in response to usage behavior of one or more users forwarded by the client systems, without fear of corrupting the mater copy. Periodically, such updated prediction models can be returned to the application library 171.

Alternatively, or in conjunction, the prediction engine can operate on a default prediction model as modified by a differential model 406. A differential prediction model can be used to alter various aspects of the basic model based upon information related to a given user or user-type. For example, as a user interacts with a streamed application, information regarding the manner of interaction and usage behavior can be forwarded from the client to the server. Rather than modifying the primary or default prediction model for the streaming application, a personalized differential prediction model for that user can be generated. The differential model can be stored in the user database 173. When a subsequent streaming session is initiated, the differential prediction model associated with the given user can be extracted from the user database and provided to the prediction engine so that the default prediction model for the streaming application will be modified in a manner best suited for the given user. Depending on the manner in which the prediction models are implemented, it may be more appropriate to store a complete prediction model for each user which can be freely modified rather than storing variations or differentials of the default model.

As discussed above, in order to process streaming applications, a suitable client environment, such as the virtual file system discussed above, should be provided on the client. To this end, a streaming environment software repository 408 can be made available to the server. Repository 408 can be used to store different versions of client-side software for use on various client computing platforms. When a client first requests use of a streaming application, suitable environmental software can be retrieved from the repository 408 and installed on the client system. Suitable automated installation processes will be known to those of skill in the art.

During the streaming process, the streaming manager 400 can maintain a record of the status of the various clients and the applications being streamed to them. This information can include, for example, a given user's position in the prediction model for a streaming application. According to one particular aspect of the invention, the streaming manager 400 can also maintain a record of the streamlets which have been sent to a given client. In a preferred embodiment, the record is maintained as a bit map with each bit corresponding to a particular streamlet. This record can be used, e.g., by the prediction engine 402, to determine appropriate streamlets to send to a client at a given time since an initial while avoiding resending streamlets which are already present, thus improving the overall network utilization and streaming efficiency.

Under some circumstances, the server-maintained image of the client's contents can become out of sync. For example, the client may discard data blocks from its VFS to make room for new streamlets. In this case, eventually, an on-demand request for a particular streamlet will be issued by the client for data which the server shows as already being present on the client side. The Server can then request an image update, in response to which the Client will send a current image of the VFS population, preferably in the same format as the server map. The client can also send an image to the server when a previously run application is being restarted or in response to the server sending a streamlet which is already present on the client to ensure that the server has the most current VFS image.

Figure 5:
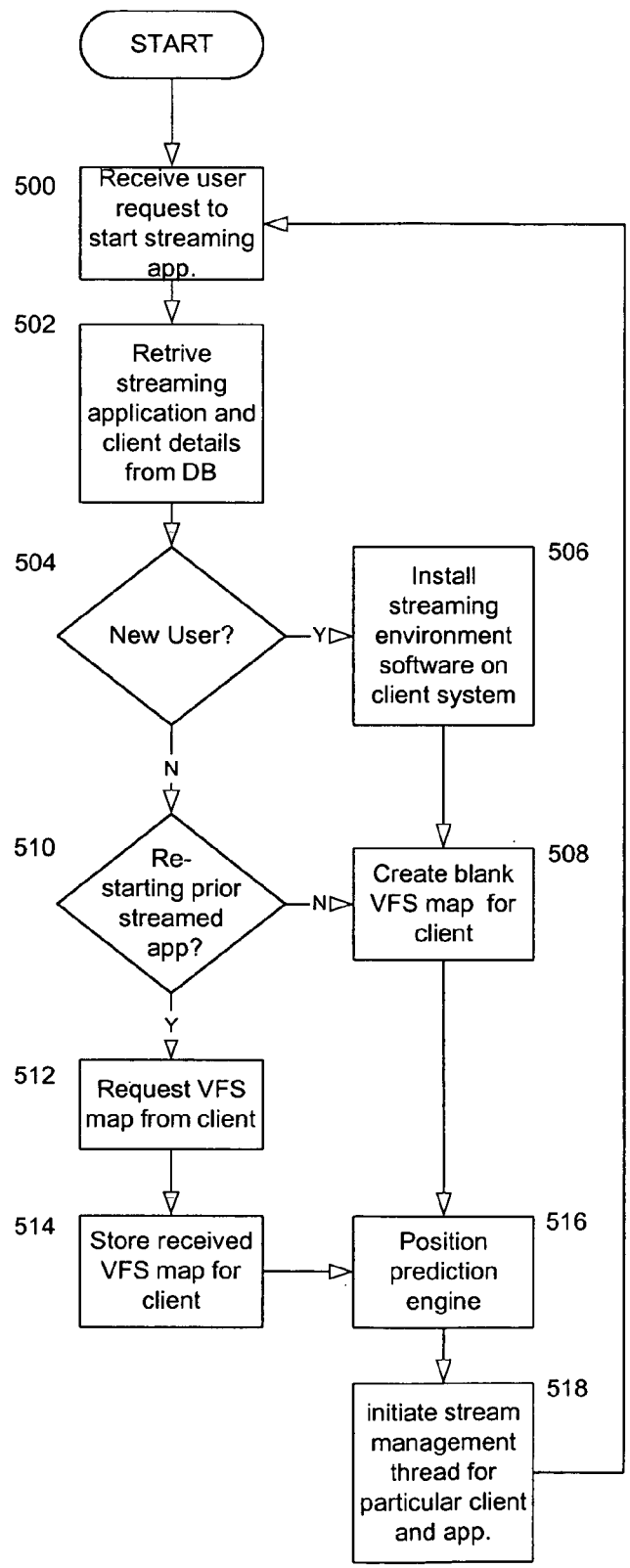
FIG. 5 is shown a high-level flowchart of the operation of a central streaming manager system.
Figure 6A:
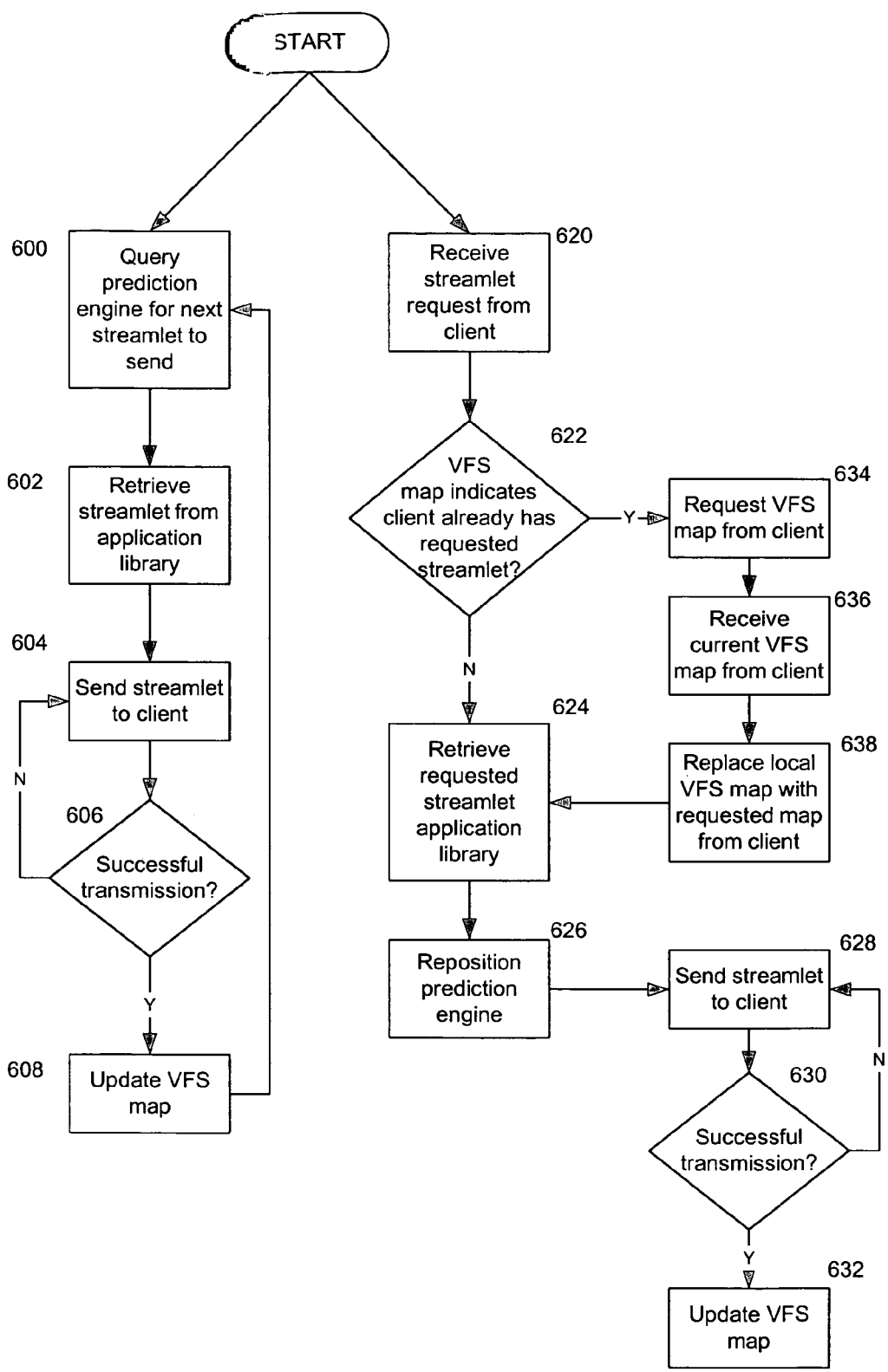
FIGS. 6A and 6B are flow charts illustrating the operation of one implementation of a streaming management thread.
Figure 6B:
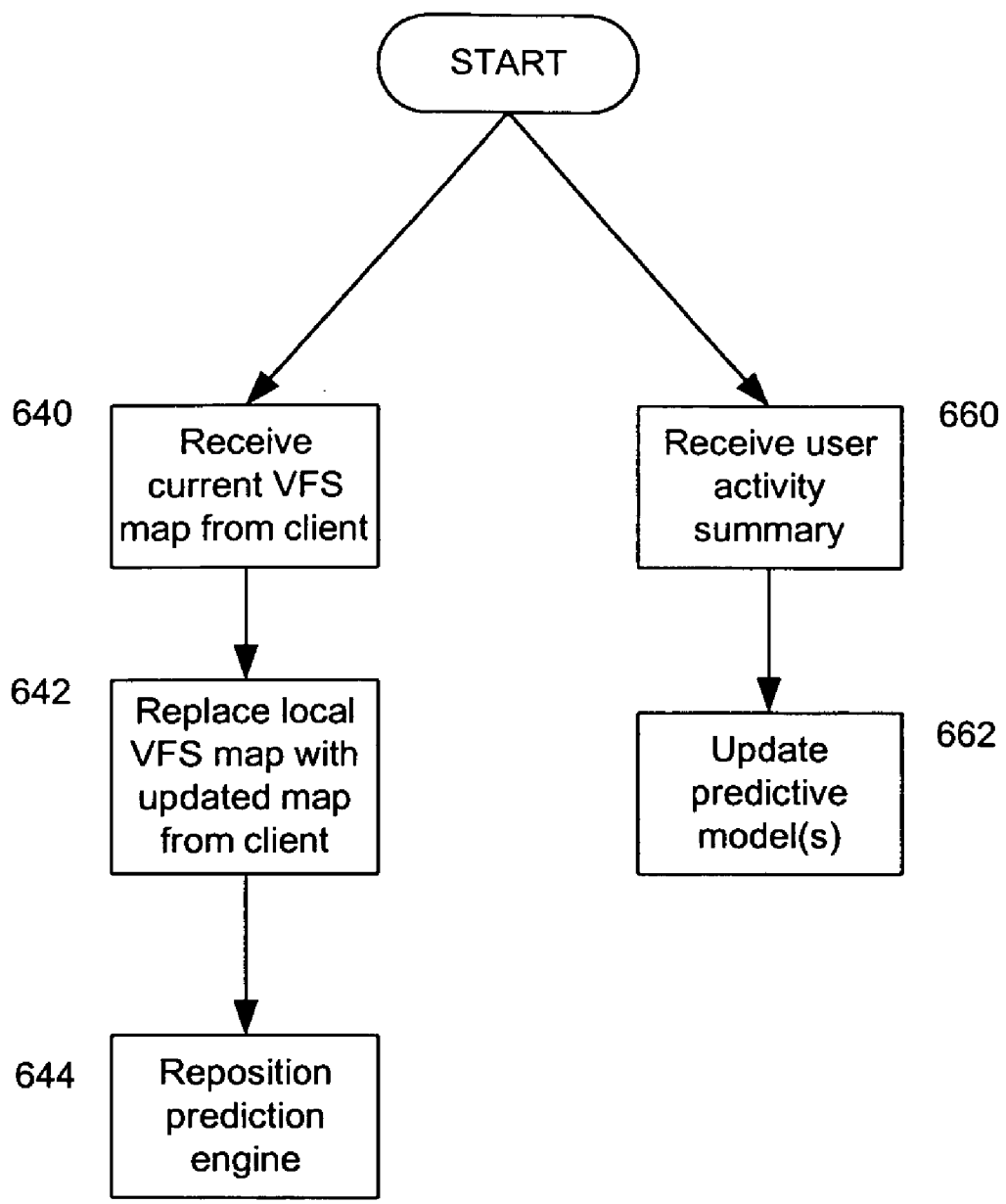

The software implementation of the streaming manager 400 can be configured in a variety of ways. FIGS. 5, 6A and 6B are flowcharts illustrating one method of implementing the server functionality. In general, this streaming software has two primary components. One component is the central system which manages the initiation of a streaming application session, shown in the flowchart of FIG. 5. The second component is the functionality that manages the actual predictive and interactive streaming session of an application for a given client, shown in the flowcharts of FIGS. 6A and 6B.

The prediction engine itself is a third component of the server system. However, the internal functionality of the prediction engine is not the focus of the present invention. Rather, the prediction engine can be implemented using one of many techniques known to those of skill in the art.

Turning to FIG. 5, there is shown a high-level flowchart of the central streaming manager system which manages the initiation of a streaming application session. The streaming process begins when a user requests to start or resume execution of a streaming application. (Step 500). After a suitable logon or user verification process, details regarding the streaming application and the user are retrieved from the appropriate database (step 502). Such data can include, for example, records of prior uses of the application by the user, limits on various features of the application which can be accessed by that user, billing information, etc. In addition, the streaming application's prediction model (and any user-specific versions thereof) are retrieved, if necessary, and made available to the prediction engine.

If the user is a new user of the streaming system (step 504), the type of client system is determined and appropriate streaming environment software is installed on the client system (step 506). After the streaming environment is set up on the client's system, an empty streamlet or VFS map for that particular client is created on the server. (Step 508). An empty VFS map is also created if the user is a returning user but is not restarting a previously streamed application. (Step 504, 510).

If the client is restarting a previously streamed application, for example, after suspending a streaming session for a period of time, the server can retrieve a saved copy of its local VFS map for that client. However, the contents of the VFS on the client may have changed during the streaming suspension period. Thus, preferably, the server sends a request to the client system asking it to send a copy of its VFS map. This data will indicate which streamlets for the selected application are present on the client's system when the streaming application is restarted. When the map is returned, it is stored on the server, for example, in the application status database 410. (Step 514).

Once the empty VFS map is created or the current VFS map is retrieved from the client, the prediction engine is positioned at the appropriate place in the prediction model for the application. For a new application streaming session, the prediction engine can be located at a point where it will direct that the Init block or Startup block be forwarded to the client. (Alternatively, transmission of the Startup block can be managed by the streaming manager without use of the prediction engine, and the prediction engine only utilized after the initial data transmission process.) If the client has already used the application, and as will be indicated in the VFS map, the client may already have portions of the application stored locally and therefore a different starting position in the streaming prediction model may be warranted. The appropriate position in the prediction module use for streaming can be determined by the streaming manager or a suitable functionality to make this decision can be included in the prediction engine itself. (Step 516).

Finally, a program thread or stream is initiated to manage the particulars for streaming the selected application to that particular client. (Step 518). Preferably a separate streaming thread is initiated on the server for each streamed application being run by each client. Different implementations are also possible and alternative functionality can be provided which will manage multiple application streams simultaneously.

FIGS. 6A and 6B are flow charts illustrating the functionality which is present in one implementation of a streaming management thread. Four separate program paths are illustrated beginning with steps 600, 620, 640 and 660 respectively. The tasks will generally operate in parallel. Suitable techniques for implementing such a multifunction program thread (or threads) are known to those of skill in the art.

Step 600 is the beginning of the main streaming program loop. Once a streaming application has started, the prediction engine is queried to determine the next streamlet or streamlets which are appropriate to send to the client's system. (Step 600). The appropriate streamlets are then retrieved from the application library (step 602) and transmitted to the client. (Step 604). If the transmission is not successful (step 606) the streamlet can be resent. Upon a successful transmission, the server-maintained copy of the client VFS map is updated to reflect the fact that the sent streamlets are now present on the client system. The process then repeats, wherein the prediction engine indicates the next sets of streamlets to send to the client.

During operation of the application on the client system, the program may need to retrieve portions of the application files which have not yet been provided by the server. When this occurs, the client issues a query to the server requesting that the appropriate streamlets be provided. When such a streamlet request is received from a client (Step 620), the server determines whether the server-maintained VFS map indicates that the requested streamlet has previously been sent to the client. (Step 622). If the requested streamlet has not previously been sent to the client, the streamlet is retrieved from the applications library. (Step 624). In addition, the position in the prediction engine may need to be repositioned within the prediction model to account for the fact that the user has place the application in a state which requires streamlets that were not predictively sent. (Step 626). The retrieved streamlet is then forwarded to the client and the server maintained VFS map is updated accordingly. (Step 628, 630, 632).

In some cases, the server maintained VFS map will indicate that the streamlet requested by the client is already present on the client's system. This can occur, for example, when the client has purged streamlets from memory or disc to make room for more frequently or more recently required streamlets. In response to such a mismatch (or after a predetermined number of such mismatches have been detected), the server requests the current VFS map from the client. (Step 634). After the client's VFS map is received (step 636) the server's copy is replaced with the map returned from the client. (Step 638). The requested streamlet is then retrieved from the application library, the prediction engine repositioned if needed, and the streamlet sent to the client. (Steps 62–632). It should be noted that the client's VFS map could be requested after the streamlet has been sent or the streamlet transmission and VFS synchronization can be performed in parallel.

There are also situations when the client's system can detect that the server may not have an up-to-date version of the VFS map or that the server map may have been corrupted. For example, the server can send a streamlet to the client which the client already has. When such a mismatch is detected, the client can indicate this synchronization error by sending a current copy of its VFS map to the server. As shown in FIG. 6B, when the server receives a current VFS map from a given client (Step 640) it assumes that the client has detected such mismatched condition and replaces the local map with the updated map received from the client. (Step 642). The prediction engine can also be repositioned based on the differences between the old and new VFS maps. (Step 644). The server and client-supplied maps can be compared (e.g., by applying an XOR function) to identify and log the mismatch and this later analyzed to determine the cause of the unnecessary streamlet transmission, such as an error in the prediction engine.

In addition, and as discussed above, during the course of executing the streamed application on the user's system, the client can periodically send user activity summaries, such as application usage tracking information, to the server indicating the order in which various parts of the application file have been accessed by the user. When a user activity summary is received at the server (Step 660) it can be used to update the various predictive models for the streaming application. (Step 662). For example, the application usage data can be used to generate or modify the differential prediction model 406 associated with the particular client or client type and which is used in conjunction with a default prediction model to determine which streamlets to send to the client at a given time. User activity data can also be analyzed in the aggregate and used to update the default prediction model as required. Various other uses for such data are also possible.

According to further aspects of the invention, the general application streaming methodology disclosed above can be integrated with a billing systems to implement various Application Service Provider models, such as Pay-Per-Use, time-based payment, subscriptions, or function-based payment, etc. The management of this functionality can be provided by a billing module (not shown) which interfaces with the streaming manager 400 to monitor usage of streamed applications by the various users, indicate usage limitations, record usage charges, etc.

Various hardware platforms can be used to implement the server system. Preferably, the streaming server is implemented using a Windows NT or Solaris environment and is connected to the Internet using conventional means. As will be appreciated, because the server does not execute the streamed program, but simply pushes data blocks and services requests, the server's operating environment does not need to be compatible with the client environment.

While the invention has been particularly shown and described with reference to preferred embodiments thereof, it will be understood by those skilled in the art that various changes in form and details may be made without departing from the spirit and scope of the invention. For example, different applications may reside on multiple servers and a user executing several streaming applications may access multiple servers. In addition, the breakdown and division of functionality between the various software routines and databases in the server 12 can vary depending on implementation issues and design choices such that the functionality attributed to one module can be performed by multiple software routines and the functionality of two or more modules can be combined into a single routine.

The invention claimed is:

1. A system for streaming a software application to a client, the system comprising:
    an application library having stored therein a prediction model and application files of the software application, the application files including executable code;
    a streaming manager configured to send the application files to a client as a plurality of streamlets including executable code, each streamlet corresponding to a particular data block in a respective application file, and configured to send to the client, upon a first initiation of streaming the application, a file structure specification of the application files and a set of streamlets comprising at least those streamlets containing the portions of the application required to enable execution of the application to be initiated; and a streaming prediction engine configured to identify at least one streamlet as most appropriate to send to the client at a particular time, based on an order in which code is predicted to be used when the software application is executed on the client, in accordance with the prediction model.

2. The system of claim 1, wherein each streamlet corresponds to a file data block having a size equal to a code page size used during file reads by an operating system expected to be present on a client system.

3. The system of claim 2, wherein the data block size is four kilobytes.

4. The system of claim 1, wherein the application files are stored in the application library as preprocessed streamlets, each streamlet corresponding to a data block in a particular application file at a particular offset and having a predefined length.

5. The system of claim 4, wherein the predefined length comprises a code page size used during file reads by an operating system expected to be present on a client system.

6. The system of claim 4, wherein each preprocessed streamlet is compressed.

7. The system of claim 1, wherein the application library has a startup block comprising the file structure specification and set of streamlets stored therein.

8. The system of claim 1, wherein the streaming manager is further configured to install streaming environment support software on the client prior to initiating an application streaming processes.

9. The system of claim 1, further comprising a differential prediction model associated with the client, the prediction engine configured to make streamlet predictions for the client in accordance with the default prediction model and the respective differential prediction model.

10. The system of claim 9, wherein the streaming manager is configured to, upon receipt of application usage tracking information from the client, update at least one of the differential prediction model for the client and the prediction model.

11. The system of claim 1, further comprising an application status repository comprising a data map for each active client, the data map generally indicating the streamlets which are present at the respective client.

12. The system of claim 11, wherein the streaming manager is configured to update the data map for the client upon a successful transmission of a streamlet to the client.

13. The system of claim 12, wherein the streaming manager is configured to, upon receipt of a request for a particular streamlet from the client:
   determine if the data map indicates that the client already has the requested streamlet;
   if the data map indicates that the requested streamlet is on the client system, request an updated data map from the client and replace the data map with a returned updated map;
   retrieve the requested streamlet from the application library; and
   update the data map upon a successful transmission of the requested streamlet to the client.

14. The system of claim 13, wherein the streaming manager is further configured to, upon receipt of the streamlet request from the client, reposition the prediction engine in the default prediction model in accordance with the requested streamlet.

15. The system of claim 11, wherein the streaming manager is configured to, upon receipt of an unsolicited data map from the client, replace the data map in the application status repository for the client with the data map received from the client.

16. The system of claim 15, wherein the streaming manager is further configured to, upon receipt of the unsolicited data map, compare the data map in the application status repository for the client with the data map received from the client and log mismatches.

17. A method for streaming a software application, the method comprising the steps of:
   providing at a server an application library having stored therein application files of the software application, the application files including executable code;
   forwarding the application files to a client as a particular sequence of streamlets including executable code, each streamlet corresponding to a particular data block in a respective application file, including sending to the client, upon a first initiation of streaming the application, a file structure specification of the application files and a set of streamlets comprising at least those streamlets containing the portions of the application required to enable execution of the application to be initiated; and
   determining the particular sequence of streamlets in accordance with a prediction model indicating which streamlets are most appropriate to send to the client at a particular time, based on an order in which code is predicted to be used when the software application is executed on the client.

18. The method of claim 17, wherein each streamlet corresponds to a file data block having a size equal to a code page size used during file reads by an operating system expected to be present on a client system.

19. The method of claim 18, wherein the data block size is four kilobytes.

20. The method of claim 17, further comprising the step of dividing the application files into streamlets prior to initiation of a streaming session.

21. The method of claim 17, further comprising the step of storing the application files in the application library as preprocessed streamlets, each streamlet corresponding to a data block in a particular application file at a particular offset and having a predefined length.

22. The method of claim 21, wherein the predefined length comprises a code page size used during file reads by an operating system expected to be present on a client system.

23. The method of claim 21, further comprising the step of compressing each streamlet prior to storage in the application library.

24. The method of claim 17, further comprising the step of storing in the application library a startup block comprising the file structure specification and set of streamlets stored therein.

25. The method of claim 17, further comprising the step of initiating a process to install streaming environment support software on the client prior to initiating an application streaming processes.

26. The method of claim 17, wherein the step of determining comprising determining the particular sequence of streamlets in accordance with the prediction model and a differential prediction model associated with the client.

27. The method of claim 26, further comprising the step of, upon receipt of application usage tracking information from the client, updating at least one of the differential prediction model for the client and the prediction model.

28. The method of claim 17, further comprising the steps of, upon receipt of a request for a particular streamlet from the client:
retrieving the requested streamlet from the application library; and
transmitting the streamlet to the client.

29. The method of claim 17, further comprising the steps of:
providing a data map for each active client generally indicating the streamlets which are present at the respective client; and
updating the data map associated with a particular client upon a successful transmission of a streamlet to the particular client.

30. The method of claim 29, further comprising the steps of, upon receipt of a request for a particular streamlet from the client:
determining if the data map associated with the client indicates that the already has the requested streamlet; and
in response to a positive determination, requesting an updated data map from the client and replacing the data map with a returned updated map.

31. The method of claim 30, further comprising the step of adjusting a position in the prediction model for the client in accordance with the requested streamlet.

32. The method of claim 29, further comprising the step of, upon receipt of an unsolicited data map from the client, replacing the data map in the application status repository for the client with the data map received from the client.

33. The method of claim 29, further comprising the steps of:
comparing the data map in the application status repository for the client with the unsolicited data map received from the client; and
logging mismatches identified during the comparing step.

34. A computer program product stored on a computer readable medium, the product comprising a computer program for configuring a server with an application library having application files including executable code stored therein to stream a software application to a client, the computer program comprising code to configure the server to:
forward the application files to the client as a particular sequence of streamlets including executable code, each streamlet corresponding to a particular data block in a respective application file, including sending to the client, upon a first initiation of streaming the software application, a file structure specification of the application files and a set of streamlets comprising at least those streamlets containing the portions of the software application required to enable execution of the software application to be initiated; and
determine the particular sequence of streamlets in accordance with a prediction model indicating which streamlets are most appropriate to send to the client at a particular time, based on an order in which code is predicted to be used when the software application is executed on the client.

35. The computer program product of claim 34, the computer program further comprising code to further configure the server to divide the application files into streamlets prior to initiation of a streaming session.

36. The computer program product of claim 35, the computer program further comprising code to configure the server to divide the application files into streamlets corresponding to a data block in a particular application file at a particular offset and having a predefined length.

37. The computer program product of claim 34, the computer program further comprising code to store in the application library a startup block comprising the file structure specification and set of streamlets stored therein.

38. The computer program product of claim 34, the computer program further comprising code to install streaming environment support software on the client prior to initiating an application streaming processes.

39. The computer program product of claim 34, the computer program further comprising code to determine the particular sequence of streamlets in accordance with the prediction model and a differential prediction model associated with the client.

40. The computer program product of claim 39, the computer program further comprising code to, upon receipt at the server of application usage tracking information from the client, update at least one of the differential prediction model for the client and the prediction model.

41. The computer program product of claim 34, the computer program further comprising code to, upon receipt at the server of a request for a particular streamlet from the client:
retrieve the requested streamlet from the application library; and
transmit the streamlet to the client.

42. The computer program product of claim 32, the computer program further comprising code to:
provide a data map for each active client generally indicating the streamlets which are present at the respective client; and
update the data map associated with a particular client upon a successful transmission of a streamlet to the particular client.

43. The computer program product of claim 42, the computer program further comprising code to, upon receipt at the server of a request for a particular streamlet from the client:
determine if the data map associated with the client indicates that the already has the requested streamlet; and
in response to a positive determination, request an updated data map from the client and replacing the data map with a returned updated map.

44. The computer program product of claim 43, the computer program further comprising code to adjust a position in the prediction model for the client in accordance with the requested streamlet.

45. The computer program product of claim 42, the computer program further comprising code to, upon receipt at the server of an unsolicited data map from the client, replace the data map in the application status repository for the client with the data map received from the client.

46. The computer program product of claim 45, the computer program further comprising code to:
compare the data map in the application status repository for the client with the unsolicited data map received from the client; and
log mismatches identified during the comparing step.

* * * * *